(12) United States Patent
Kueck

(10) Patent No.: US 7,996,341 B1
(45) Date of Patent: Aug. 9, 2011

(54) METHODS AND SYSTEMS FOR SEARCHING FOR COLOR THEMES, SUGGESTING COLOR THEME TAGS, AND ESTIMATING TAG DESCRIPTIVENESS

(75) Inventor: Hendrik Kueck, Vancouver (CA)

(73) Assignee: Adobe Systems Incorporated, San Jose, CA (US)

( * ) Notice: Subject to any disclaimer, the term of this patent is extended or adjusted under 35 U.S.C. 154(b) by 874 days.

(21) Appl. No.: 11/961,150

(22) Filed: Dec. 20, 2007

(51) Int. Cl.
*G06F 15/18* (2006.01)
*G06K 9/00* (2006.01)

(52) U.S. Cl. .......................................... 706/12; 382/165

(58) Field of Classification Search .................. None
See application file for complete search history.

(56) References Cited

U.S. PATENT DOCUMENTS

| | | | | |
|---|---|---|---|---|
| 5,615,320 | A * | 3/1997 | Lavendel | 345/594 |
| 6,892,194 | B2 * | 5/2005 | McClanahan | 706/20 |
| 7,605,824 | B2 * | 10/2009 | Reynolds et al. | 345/589 |
| 7,716,157 | B1 * | 5/2010 | Bourdev et al. | 1/1 |

OTHER PUBLICATIONS

Platt; "Probabilistic Outputs for Support Vector Machines and Comparisons to Regularized Likelihood Methods"; 1999; MIT Press; Advances in Large Margin Classifiers; pp. 1-11.*
Binaghi, Elisabetta; "Image Retrieval Using Fuzzy Evaluation of Color Similarity"; 1994; International Journal of Pattern Recognition and Artificial Intelligence, vol. 8, No. 4; pp. 945-968.*
Mehtre, Babu M.; "Color matching for image retriefal"; 1995; Elsevier Science B.V., Pattern Recognition Letters, vol. 16, Issue 3; pp. 325-331.*
Gevers, T.; "A Comparative Study of Several Color Models for Color Image Invariant Retrieval"; 1996; University of Amsterdam, First International Workshop on Image Databases and Multi Media Search; pp. 17-26.*
Rubner et al., "The Earth Mover's Distance as a Metric for Image Retrieval," http://vision.stanford.edu/public/publication/rubner/rubnerTr98.pdf.
D.M. Conway, "An Experimenttal Comparision of Three Natural Language Colour Naming Models," In Proc. east-west Int. conf on Human-Computer Interaction, 1992, pp. 328-339.
J.M. Lammens, A Computational Model of Color Perception and Color Naming. PhD thesis, University of Buffalo, Jun. 1994.
A. Mojsilovic, A Computational Model for Color Naming and Describing Color Composision of Images, IEEE Transactions on Image Processing, 14(5):690-699, May 2005.
R. Benavente et al., A Data Set for Fuzzy Colour Naming, Color Research and Application, 31(1): 48-56. 2006.
J. Van De Weijer et al. Learing Color Names from Real-World Images, Proc. CVPR07, Minneapolis, USA, 2007.
Y. Freund et al., A Decision-Theoretic Generalization of On-Line Learning and an Application to Boosting, Journal of Computer and System Sciences, 1997.

(Continued)

*Primary Examiner* — Jeffrey A Graffin
*Assistant Examiner* — Stanley K Hill
(74) *Attorney, Agent, or Firm* — Kilpatrick Townsend & Stockton LLP

(57) ABSTRACT

Embodiments of the present disclosure assess how well a tag describes a color theme by estimating a descriptiveness value for the tag for the color theme. Some embodiments determine descriptiveness values for a tag based on weighted color attributes determined from the tag's existing use in a color theme collection. Descriptiveness values are used generally in color theme searching and to suggest tags for a color theme, among other things.

28 Claims, 6 Drawing Sheets

OTHER PUBLICATIONS

J. Platt, Platt Scaling Algorithm: Probablistic Outputs for Support Vector Machines and Comparison to Regularized Likelihood Methods, In Advances in Large Margin Classifiers, Mar. 26, 1999, pp. 1-11.

H.-T. Lin, A Note on Platt's Probabilistic Outputs for Support Vector Machines, 2003.

Kuler—color theme application, http://kuler.adobe.com/#.

* cited by examiner

METHODS AND SYSTEMS FOR SEARCHING FOR COLOR THEMES, SUGGESTING COLOR THEME TAGS, AND ESTIMATING TAG DESCRIPTIVENESS

FIELD OF THE DISCLOSURE

Embodiments of the present disclosure relate generally to color themes and tags associated with color themes and specifically relate to methods and systems for searching for color themes, suggesting color theme tags, and estimating tag descriptiveness.

BACKGROUND

A color theme is a set of one or more colors. Color themes are created for use in, among other things, designing Web pages, computer applications, print documents, and in architectural and interior design. A collection of color themes may be stored together and/or made accessible to multiple users through a network. Such a computerized collection may grow to include thousands of color themes that may be left unsorted and uncategorized. Tags are used to help collection users find and organize color themes. A tag is typically a word, phrase, or other construct that is used to describe a color theme's look and feel or purpose, or to otherwise describe it. For example, a color theme for a child's playroom might be tagged with "playful," "cheerful," and the child's name—"Mary." Various tags are supported by Adobe® products including Photoshop®, Illustrator®, Creative Suite®, Kuler™, and other products.

The present version of the Adobe® Kuler™ service allows designers to create, share and search for color themes online. For example, a user can create a color theme for a new home office and associate it with "cozy" and "rebirth" tags. The tags allow the user and others to search for that color theme and other available color themes associated with the exact search tags. However, the usefulness of such searching depends on consistent and relevant tagging. Users can also browse through a collection's color themes. However, such manual browsing is time-consuming for large collections.

SUMMARY

Embodiments of the present disclosure assess how well a tag describes a color theme by estimating a descriptiveness value of the tag for the color theme. Some embodiments determine descriptiveness values for a tag based on weighted color attributes determined from the tag's existing use (associations and/or absence of associations) in a color theme collection. Descriptiveness values may be used in color theme searching and to suggest tags for a color theme, among other things.

One embodiment of the present disclosure is a method of estimating descriptiveness values for a tag based at least in part on the existing tag use (associations and/or absence of associations) in a color theme collection. Color attributes are identified for a tag based on the use of the tag with color themes of the collection. In this case, each color attribute is a characteristic that is either present or not present in a color theme. For example, a color attribute may be whether a color theme has a color within a particular region of color space. A weight is also determined for each color attribute. The weight for each color attribute generally represents the significance of the color attribute's presence to whether the tag is descriptive i.e., how much the color attribute's presence in a given color theme weighs for or against the tag being considered descriptive of that color theme. The determined color attributes and weights may be used to estimate a descriptiveness value for one or more color themes. One embodiment of the present disclosure is a method of suggesting tags for an identified color theme based on tag descriptiveness values. For each tag in a collection of color themes, weighted color attributes are determined based on the tag's use (associations and absence of associations) in the collection. For an identified color theme, the weighted color attributes of each tag are used to estimate a descriptiveness value for that tag. These descriptiveness values are used to suggest tags for the identified color theme. For example, tags having the best descriptiveness values may be suggested.

One embodiment of the present disclosure is a method of searching for color themes using a search term. For the search term, weighted color attributes are determined based on the search term's existing use (i.e., tag associations and absence of tag associations). The weighted color attributes of the search term are used to estimate a descriptiveness value for each color theme in the collection. These values are used to provide at least one color theme as a search result. For example, color themes having the best descriptiveness values may be provided.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Illustrative Determinations of Descriptiveness Values

Figure 1A:
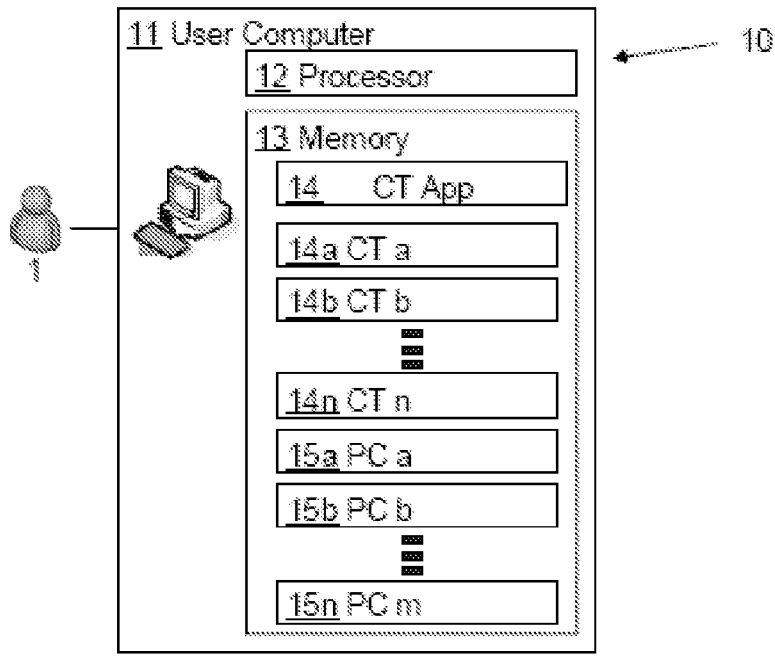
FIGS. 1A and 1B are system diagrams illustrating computer system and network environments according to certain embodiments.

One embodiment of the present disclosure provides a method of estimating a descriptiveness value of a tag for a color theme. Such a descriptiveness value provides a measure of how well the tag describes the color theme. Descriptiveness values may be used to improve color theme searching and facilitate consistent and accurate color theme tagging. For example, a tag-based color theme search may identify color themes having the best descriptiveness values for the search tag. Similarly, tags may be suggested for a given color theme based on descriptiveness values. Such suggestions may improve the consistency of tag use by a single user and amongst multiple users of a color theme collection.

The following example introduces exemplary determinations of descriptiveness values for an exemplary "summer" tag. Color themes in the collection tagged with "summer," as well as color themes that are not tagged with "summer," are used to determine color attributes that are used in determining descriptiveness values for the "summer" tag. In this example, each color attribute may be a region of color space although any suitable color attribute may be used. Color attributes may function as weak classifiers. Generally, the terms "weak classifier" and "simple binary classifier" are used herein to refer to anything that a color theme either has or does not have—thus any attribute useable to classify color themes into two groups, those having and those not having the attribute. For example, if a particular region of color space is used as a weak classifier, a color theme either has or does not have at least one color that falls within that particular region of color space. At least some of the color attributes identified for the "summer" tag may correspond to regions of color space that contain colors that are commonly found in existing color themes already tagged with the "summer" tag.

Color themes in the collection already tagged with "summer," as well as color themes that are not tagged with "summer," are also used to determine weights for the color attributes identified for the "summer" tag. For example, the presence or absence of a first color attribute may be twice as significant as the presence or absence of a second color attribute. In other words, the fact that a color theme has a color falling within a first region of color space may be twice as significant to whether "summer" is descriptive as the color theme having a color falling within a second region of color space. A color attribute may be negative in that its presence in a color theme will weigh against or otherwise decrease a descriptiveness value determined for the color theme. The identification and weighting of the color attributes may be made by any suitable technique, including using of an Adaboost algorithm, as discussed herein. Also, color attributes and weights may be determined at the same time or as part of separate steps.

In the present example, sixty regions of color space are identified as color attributes for the "summer" tag and a weight is determined for each attribute. The color attributes and weights collectively are the parameters for the "summer" tag that may be used in determining a descriptiveness value for the "summer" tag for any color theme. In other words, any given color theme can be assessed using the color attributes by determining whether at least one of its colors fall with each of the sixty regions of color space corresponding to the sixty "summer" color attributes. These results are combined or otherwise used according to their weights to yield a descriptiveness value for the "summer" tag for the given color theme.

The combination of color attributes and weights for "summer" may ultimately used as a strong classifier for the "summer" tag. Generally, the term "strong classifier" is used herein to refer to anything that utilizes weak classifiers (weighted or not) to assess a color theme. In the present example, any given color theme is assessed according to the "summer" strong classifier by assessing the color attributes and combining the color attribute results according to their weights. The combined result is the result of the strong classifier and is a value that is (or may be scaled to reflect) the descriptiveness value of the "summer" tag for the given color theme.

The results may be adjusted or scaled to provide comparable values or for any other reason. For example, the results may be scaled to a value between 0 and 1. Thus, when a first color theme gives a "summer" descriptiveness value of 0.9 and a second color theme gives a "summer" descriptiveness value of "0.1," the technique has estimated that "summer" is a better description of the first color theme than the second color theme. In the tag-based searching context, a user may search for "summer" color themes. In response, the "summer" descriptiveness values of each color theme in the collection may be determined and the color themes having the best "summer" descriptiveness values may be provided as search results. A user searching for color themes using the "summer" tag may receive a response that includes both color themes that are actually tagged with "summer" and color themes that are not themselves tagged with a "summer" tag.

The "summer" descriptiveness values may be used in other contexts as well. For example, if a user creates a color theme, descriptiveness values may be assessed or compared for different tags to provide suggested tags to the color theme creator. A descriptiveness value of 0.95 may be interpreted to identify "summer" as an appropriate tag for the newly created color theme. Descriptiveness values may also be determined for other tags (using their own tag strong classifiers) and the values compared to determine and suggest the most appropriate tags for the newly created color theme.

This illustrative example is given to introduce the reader to the general subject matter discussed herein. The disclosure is not limited to this example. The following sections describe various additional embodiments and examples of methods and systems for comparing and discovering similar color themes and tags.

Illustrative Network Configuration for Discovering Color Themes and Tags

Figure 1B:
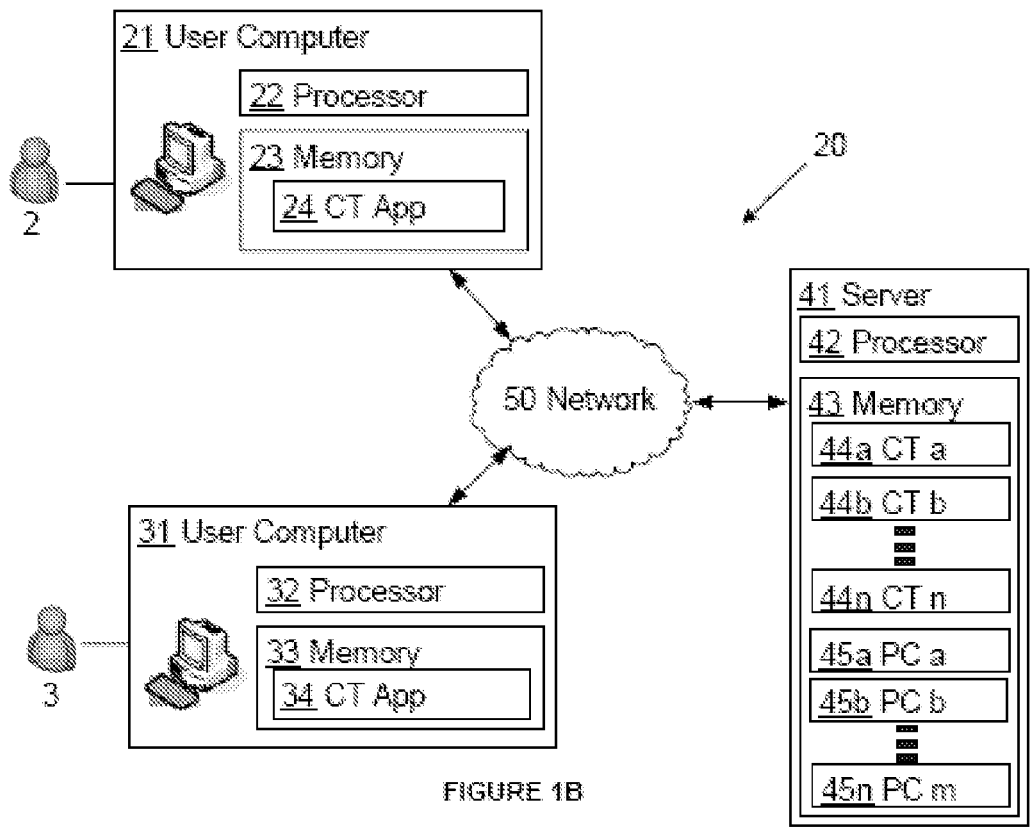

Referring now to the drawings in which like numerals indicate like elements throughout the several figures. FIGS. 1A and 1B are system diagrams illustrating color theme use and management environments according to several embodiments. Other embodiments may be utilized. The system 10 shown in FIG. 1A comprises a user computer 11 that comprises a computer-readable medium such as a random access memory (RAM) 13, coupled to a processor 12 that executes computer-executable program instructions stored in memory. Such a processor 12 may comprise a microprocessor, an ASIC, a state machine, or other processor, and can be any of a number of computer processors, such as processors from Intel Corporation and Advanced Micro Devices, Incorporated (AMD). Such processor may comprise, or may be in communication with, media, for example, computer-readable media, which stores instruction that, when executed by the processor, cause the processor to perform the steps described herein. An alternative system 20 shown in FIG. 1B comprises a wired or wireless network 50 connecting user computers 21, 31 and a server 41. The devices 21, 31, 41 each may comprise a computer-readable medium such as a RAM 23, 33, 43, coupled to a preprocessor 22, 32, 42, that executes computer-executable program instructions stored in memory.

Embodiments of computer-readable media comprise, but are not limited to, an electronic, optical, magnetic, or other storage or transmission device capable of providing a processor with computer-readable instructions. Other examples of suitable media comprise, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, ActionScript, and JavaScript.

In FIG. 1A, the user computer 11 comprises a color theme application 14 that may reside in memory 13. The color theme application 14, for example, may be an application that allows a user to create, organize, edit, store, import, export, delete, tag, and/or view one or more color themes, among other functions. The color themes themselves are typically graphical representations displayed on a computer screen of a color theme file 14a-n. However color themes need not be stored as files. Color attributes, weights, and/or probabilistic classifiers 15a-m for the associated tags of the collection may also reside in memory 13. A color theme application may be a dedicated application designed to help a user create, manage and view images, may be a file management application that allows a user to organize color theme files and then launch or otherwise display the contents of the color theme file, whether in that application or through another application. A color theme application may display icons that are based or derived from the content of a color theme file. For example, a color theme application may be a file organizing application that displays color theme files as icons of the color themes themselves.

As illustrated in FIG. 1B, methods according to the present disclosure need not operate within a single device. For example, users operating separate devices 21, 31 may view or receive color themes 44a-n and associated color attributes, weights, and/or probabilistic classifiers 45a-m stored on a separate device 41. A network 50, which may be any suitable private network, public network, or the Internet, may be employed to facilitate the sharing of images and to allow different users and different locations to access, manage, view, tag, or otherwise use a collection of color themes, such as color themes 44a-n. Additionally, the color theme application 24, 34 may be a desktop color theme application or a web application run through an Internet browser, or any combination thereof, such that the combination of the application 24, 34 with the server 41 through the network 50 provides the users 2, 3 with the functionalities of the present disclosure. As shown in FIGS. 1A and 1B, the application may be color theme application 14, 24, or 34. Alternative configurations are of course possible.

Generally, the devices 11, 21, 31, 41 of FIGS. 1A and 1B may also comprise a number of external or internal devices such as a mouse, a CD-ROM, DVD, a keyboard, a display, or other input or output devices. Examples of such devices are personal computers, digital assistants, personal digital assistants, cellular phones, mobile phones, smart phones, pagers, digital tablets, laptop computers, Internet appliances, and other processor-based devices. In general, a device may involve any type of processor-based platform that operates on any operating system, such as Microsoft® Windows® or Linux, capable of supporting one or more client application programs. Other applications can be contained in memory 13, 23, 33, 43 and can comprise, for example, a word processing application, a spreadsheet application, an e-mail application, a media player application, an instant messenger application, a presentation application, an Internet browser application, a calendar/organizer application, and any suitable application or computer program. For example, the application 24, 34 can simply be a web application run through an Internet browser that permits the users 2, 3 to access, view, or receive color themes 44a-n stored on a separate device 41. Other configurations may also involve server devices, mainframe computers, networked computers, and other system configurations appropriate for the particular context.

Certain embodiments of the present disclosure relate to systems used for color theme tag-based searching and tag suggesting on a computing device. It will be recognized that this is merely one context. Certain embodiments will involve color theme management on a digital scanner, PDA, or in other contexts. The methods of organizing color themes using tags are applicable in the color theme context and in the more general context of any file or other object that can be tagged and organized. The techniques for organizing and displaying content and the other features described herein have uses in a variety of contexts, not limited by the specific illustrations provided herein. The systems shown in FIGS. 1A and 1B and methods described herein are merely illustrative and are not intended to recite any system component or feature as essential or necessary to any embodiment.

Illustrative Embodiments of Estimating Descriptiveness Values

Figure 2:
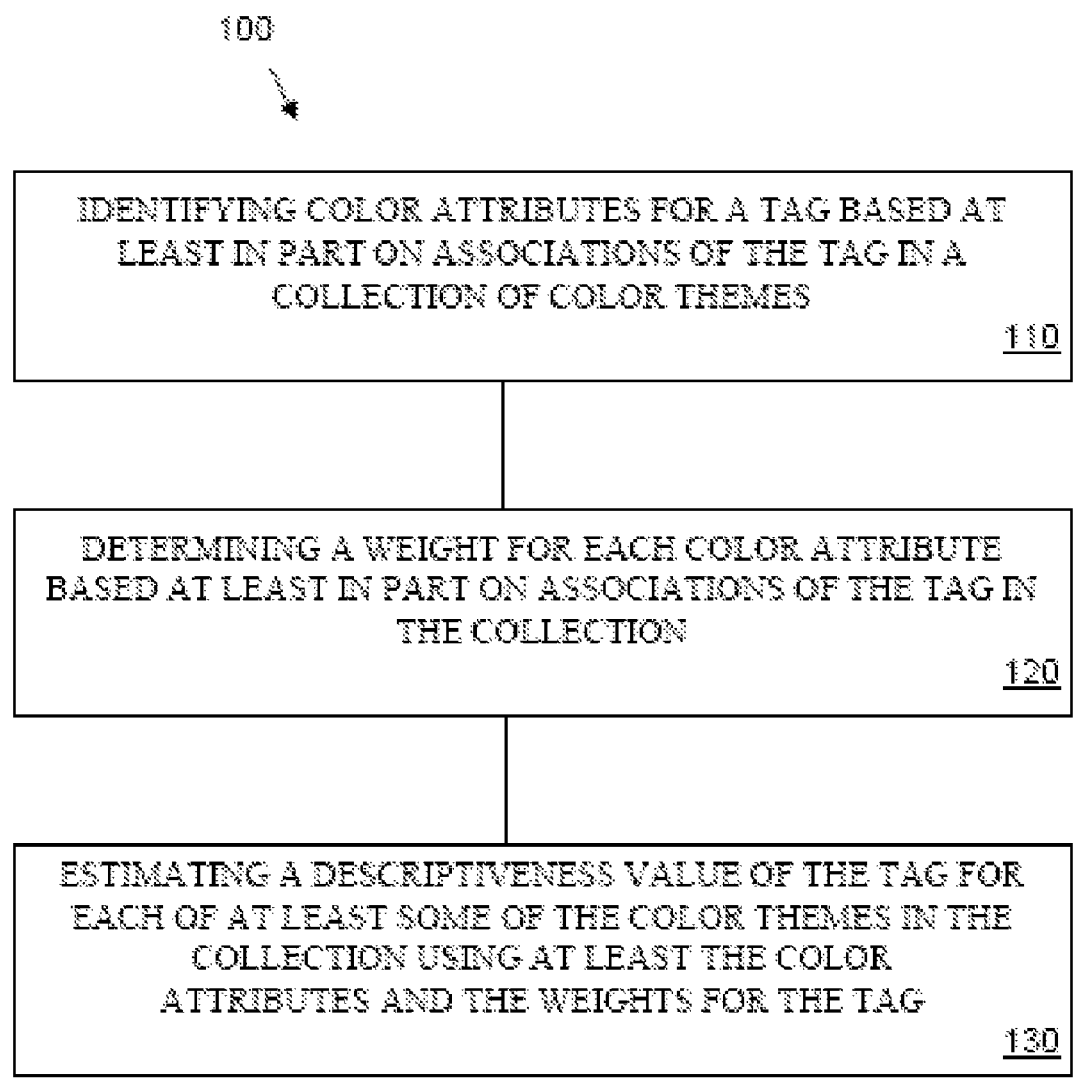
FIG. 2 is a flow chart illustrating one method of estimating descriptiveness values for some tags of a collection of color themes according to one embodiment.

FIG. 2 is a flow chart illustrating one method of estimating descriptiveness values for some tags of a collection of color themes according to one embodiment. In the method 100, color attributes for a tag are identified based at least in part on associations of the tag with color themes in a collection of color themes, as shown in block 110. Thus, some or all of the color themes in the collection that are already tagged with the tag are used to identify these color attributes. Color themes not tagged with the tag—negative examples—may be used as well. The color attributes generally, but not necessarily, are attributes that are either present or not present for a color theme and thus may function as weak or binary classifiers. For example, a color attribute acting as a weak classifier may identify a region of color space and a minimum number of colors within that region (e.g., two) that a color theme must have to receive a positive result. For such a color attribute, a color theme having zero or one color within the region of color space would give a negative classifier result, i.e. −1, while a color theme having two or more colors within the region of color space would give a positive classifier result, i.e. +1. Thus, each color attribute acting as a weak classifier may take a color theme as input and return as output a value of either −1 or 1 depending on properties of the color theme. Such simple binary or weak classifiers may thus be used to determine whether a given color theme does or does not have a particular color attribute.

In the method 100, a weight is determined for each color attribute based at least in part on associations of the tag with color themes in the collection, as shown in block 120. Thus, some or all of the color themes in the collection that are already tagged with the tag are used to determine these weights. Color themes not tagged with the tag—negative examples—may be used as well. The identification and weighting of the color attributes may be made by any suitable technique, including using of an Adaboost algorithm, as discussed herein. Also, color attributes and weights may be determined at the same time or as part of separate steps. One embodiment of the present disclosure identifies an ensemble of color attributes as weak classifiers and associated weights that are used by a strong classifier function. The weak classifiers and weights are selected so that the output value of the strong classifier function estimates how well the particular tag describes any given color theme.

In the method 100, a descriptiveness value of the tag is estimated for each of at least some of the color themes in the collection using at least the color attributes and the weights for the tag, as shown in block 130. As an example, a given color theme may be assessed according to each of the identified color attributes. The results of these assessments may be combined in any suitable manner to estimate a descriptiveness value for how well the tag describes the color theme. In the case where a strong classifier function has been determined, the weak classifier results may be combined according the weights specified by the strong classifier function. The output value of the strong classifier function may be converted (to the extent it needs to be converted) to any suitable scale, for example to a probability value between 0 and 1 (e.g., a color theme with an output of 0.9 for the given tag is a better match than a color theme with an output of only 0.2). The strong classifier function combined with a scaling technique that results in values between 0 and 1 are together referred to herein as a probabilistic classifier function (PCF). The scaled output values of a PCF are referred to as probabilistic classifier function values (PCVs).

In certain embodiments of the present disclosure a probabilistic classifier function is pre-computed, i.e., computed during a learning stage, as opposed to being computed at the time of a tag-based search or tag-suggestion request, to facilitate faster processing at the time of such a search or request. Such pre-computation is generally of little consequence since, given a sufficiently large and established collection, the color themes and associated tags of a collection are unlikely to have materially changed. Thus, in certain circumstances, the periodic, pre-computation and storage of the output (PCV) of each PCF (for all tags of the collection) for each color theme of the collection results in efficient search and retrieve operations when the color theme application is performing a tag and/or color theme search. For example, if there are N number of color themes in the collection of color themes and M number of PCFs (based on the number of tags—a PCF for each tag of the collection), then N*M number of PCVs would be stored in a database. Thus, whenever a user searches for color themes for a given tag, such as "cheerful," the application locates the best matching color themes for "cheerful" using the stored PCVs, without having to dynamically compute a PCV for all color themes.

Figure 7:
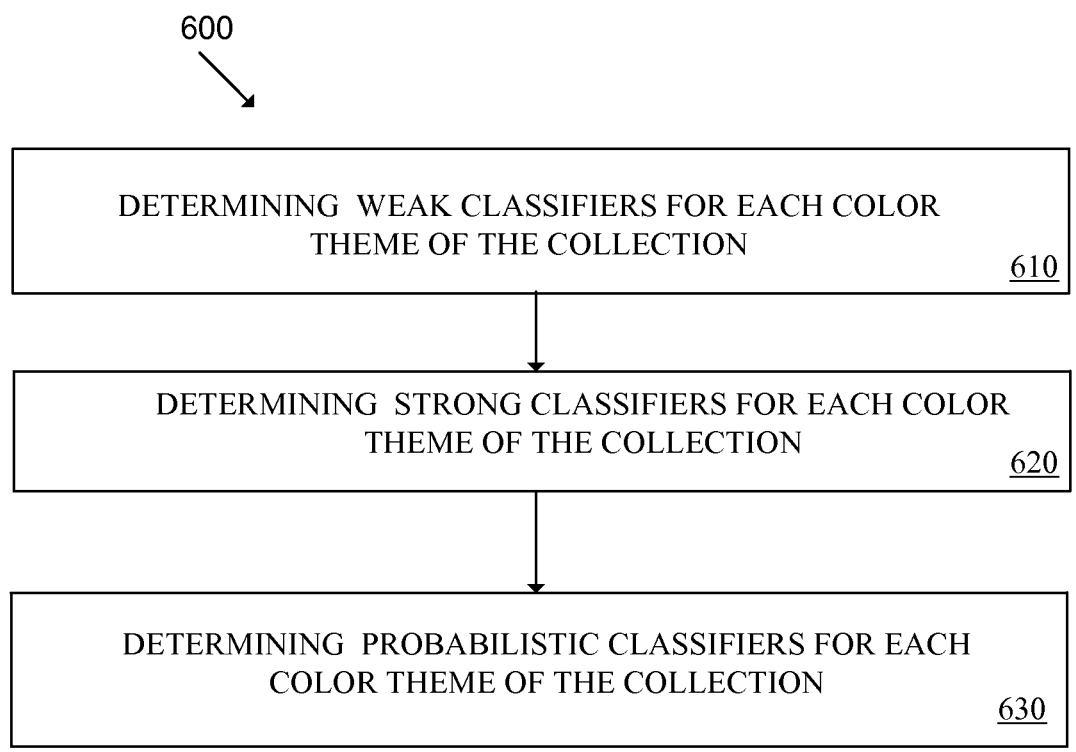
FIG. 7 is a flow chart illustrating one method of determining the probabilistic classifier functions and values for a collection of color themes according to one embodiment.

FIG. 7 is a flow chart illustrating a method 600 according to one embodiment. In the method 600 shown in FIG. 7, for each tag (or at least each sufficiently popular tag) of a color theme collection, the application 34 determines color attribute weak classifier values for each color theme 44a-n of the collection, as shown in block 610. Each weak classifier function takes a color theme as input and returns as output a value of either +1 or −1. In one embodiment of the present disclosure, each weak classifier function takes a color theme as input and for each color in the color theme it determines if the color falls within the associated color space of the weak classifier.

In this embodiment, each weak classifier represents a particular color attribute such as a region of color space. The color and color regions may be expressed using the HSV (hue, saturation, and value) color space. HSV is a three-dimensional color space which generally allows for more intuitive color specifications than the more common RGB (red, green, and blue) color space. HSV describe colors as points in a cylinder whose central axis ranges from black at the bottom to white at the top with neutral colors between them, where the angle around the axis corresponds to "hue," distance from the axis corresponds to "saturation," and distance along the axis corresponds to "value." However, it is possible to use other color spaces and/or other color attributes.

In one embodiment, a weak classifier function takes a color theme as input and for each color of the color theme it checks if the color (defined by its h, s, v values between 0 and 1) falls within the HSV region associated with the weak classifier. The weak classifier function then counts the number of colors in the color theme that fall inside the HSV region associated with the weak classifier. The resulting count is then compared against a threshold value, and if the count is larger or smaller than the threshold value, the weak classifier function returns a +1 or a −1.

For example, the associated HSV region for weak classifier A (wcA) may be expressed as: $0.2 < h \leq 0.3$
$0.5 < s \leq 0.9$
$0.3 < v \leq 1.0$
with a Threshold Value of 1, and defined to return a +1 if the count is larger than the threshold value, or a −1 otherwise. Thus, Color Theme Z, a three-part color theme, may contain the following colors expressed as:

| Color1: | h = 0.34 | s = 0.8 | v = 0.2 |
| Color2: | h = 0.25 | s = 0.6 | v = 0.8 |
| Color3: | h = 0.1 | s = 0.2 | v = 0.5 |

Applying the weak classifier function to Color Theme Z results in a −1 weak classifier value. Color2 falls inside the wcA region and Color1 and Color3 are outside of the region, so the count of colors within the wcA HSV region for Color Theme Z is only 1, which is not larger than the threshold value of 1. Thus, the wcA function returns a weak classifier value of −1 for Color Theme Z.

The large pool of associated HSV regions for the weak classifiers are created by forming all possible combinations of a large number of different HSV regions with different threshold values and the two possible directions of comparison to the threshold value (i.e., if the count is larger than threshold it return a +1, otherwise it returns a −1; or if count smaller than threshold it return a +1, otherwise it returns a −1). The HSV regions of different weak classifiers may overlap. Based on the weak classifier values, the color themes of a collection are partitioned into two sets by each weak classifier: A) Color themes with a +1 weak classifier value; and B) Color themes with a −1 weak classifier value.

After determining the weak classifiers, the application 34 determines a strong classifier value for each color theme 44a-n of the collection, as shown in block 620. The strong classifier function uses an ensemble of several weak classifier values. Typically, the number of weak classifier values used in a strong classifier ensemble will be large, possibly hundreds. Each of the weak classifier values in the ensemble has a weight (a positive real number) associated with it. The output of the strong classifier function is a real number resulting from the weighted sum of the weak classifier values in the ensemble.

For example, if a strong classifier function is used on Color Theme Y, wherein Color Theme Y has an ensemble of three weak classifier values expressed as:

| weak classifier values: | +1 | −1 | −1 |
| with associated weights of: | 100 | 30 | 5 |

The output of the strong classifier function for Color Theme Y would be:

(100*+1)+(30*−1)+(5*−1)=65

In an embodiment of the present disclosure, the strong classifiers (that is the parameters including the weak classifiers and the associated weights used by the strong classifier) are determined using the Adaboost algorithm, described in Y. Freund and R. E. Schapire, "A decision-theoretic generalization of on-line learning and an application to boosting," Journal of Computer and System Sciences (1997), incorporated herein by this reference.

The Adaboost algorithm provides a way of learning strong classifiers from data, which includes a principled way of choosing weak classifiers and weights. The Adaboost algorithm uses a training data set. The training data set consists of color themes which have been tagged with the tag of interest, called positive examples, as well as color themes which do not contain the tag of interest, called negative examples. For example, in using the Adaboost algorithm to learn a strong classifier for a "cheerful" tag, the training data set may consist of some or all color themes in the collection which users have tagged as "cheerful" (positive examples) and additionally negative examples (those not tagged "cheerful"). The negative examples may be randomly selected color themes which do not have the associated "cheerful" tag. The number of negative examples may or may not be equal to the number of positive examples in the training data set. In a sense, the general goal of using the Adaboost algorithm is to find a strong classifier which distinguishes well between the positive and negative examples. That is, a good strong classifier will return a positive value for most (or all) positive examples and a negative value for most (or all) negative examples.

The Adaboost algorithm learns a strong classifier from data by selecting an ensemble of weak classifiers out of a large pool of possible weak classifiers and determining appropriate weights for the individual weak classifiers in the selected ensemble. Each weak classifier splits all color themes in the collection into two sets: A) color themes with a +1 weak classifier value; and B) color themes with a −1 weak classifier value. Each of the weak classifiers in the pool of possible weak classifiers corresponds to a different split of color themes. Therefore, a weak classifier will also split the training data set into two sets: A) color themes in the training data set with a +1 weak classifier value; and B) color themes in the training data set with a −1 weak classifier value.

In general, these two sets are not necessarily related to the positive and negative examples in the training data set. However, a good weak classifier is one for which the two sets mostly align with the positive and negative examples in the training set. That is, a good weak classifier returns a +1 for most positive color theme examples and a −1 for most negative color theme examples. In the Adaboost algorithm, when selecting the ensemble of weak classifiers, the very first weak classifier selected is the weak classifier that makes the least errors on the training data set. An error means that the weak classifiers returns −1 for a positive example or +1 for a negative example. For example, if weak classifier wc247 made only one error, by returning a +1 for one of the negative color theme examples, Color Theme Q in the training data set, and no weak classifiers in the pool were perfect (zero errors), then wc247 would be the first selected weak classifier by the Adaboost algorithm for the ensemble of weak classifiers.

The additional weak classifiers that the Adaboost algorithm selects for the ensemble are chosen based on each weak classifier's performance on the examples in the training set, with particular emphasis on the examples which the weak classifiers already selected in the ensemble made a mistake on. This is achieved by putting weights on the examples and increasing the weights for examples which are misclassified. After selecting its ensemble of weak classifiers (including the weights for each weak classifier) the Adaboost algorithm calculates the strong classifiers. The strong classifiers result in output values that are real numbers resulting from the weighted sum of the weak classifier values.

After determining strong classifier values, the application 34 determines the PCVs for the color themes of the collection, as shown in block 630. The real value outputs of the strong classifiers are mapped to a probability value [0,1] (PCV) using the sigmoid function expressed as:

$p(y=1|f)=1/(1+\exp(A*f+B))$ where p(y=1) denotes the probability that the color theme has the tag of interest and f is the output of the strong classifiers. The parameters A and B are determined using the algorithm known as Platt scaling, described in H.-T. Lin, C.-J. Lin, and R. C. Weng, "A Note on Platt's Probabilistic Outputs for Support Vector Machines," Machine Learning, Vol. 68, No. 3 (2007) (*originally copyrighted in 2003), incorporated herein by this reference. The algorithm ensures that the resulting probabilities are properly calibrated. This ensures that comparing the outputs of the strong classifiers for the different tags is meaningful. It is possible to use numerous other algorithms or techniques to determine and calibrate strong classifiers.

Illustrative Embodiment of Suggesting Tags

One embodiment of the present disclosure suggests tags for an identified color theme. The suggested tags may be provided to a user based on an estimate of whether the suggested tag would be a good description of the color theme.

Figure 3:
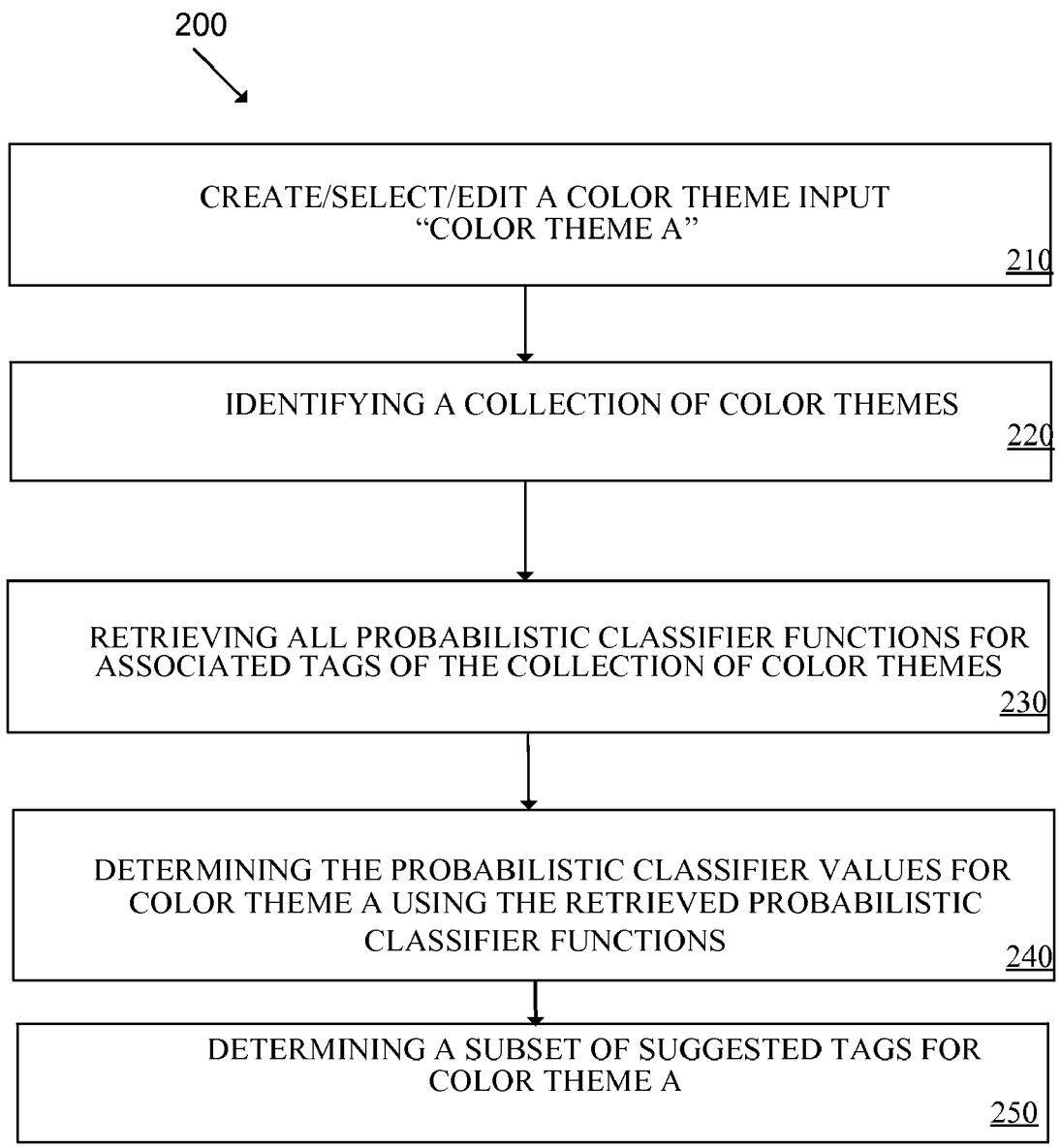
FIG. 3 is a flow chart illustrating one method of determining suggested tags based on a color theme according to one embodiment.

FIG. 3 is a flow chart illustrating one method of suggesting tags for a given color theme according to one embodiment. For purposes of illustration only, the elements of this method are described with reference to the systems depicted in FIGS. 1A and 1B. A variety of other implementations are also possible.

In the method 200 of suggesting tags shown in FIG. 3, a user invokes an application 34 and identifies a Color Theme A, as shown in block 210. As shown in FIG. 1B, the application may be color theme application 14, 24, or 34. Color Theme A can be a newly created color theme, a selected color theme, an edited color theme, etc. Color Theme A could have been created in the application 34 or in any sort of color theme application. For example, the user can select Color Theme A from another application, such as Adobe® Photoshop® and input it into the application 34.

An application 34 identifies a collection of color themes 44a-n located on the server 41, as shown in block 220. The collection of color themes may be identified by the user, for example, by the user selecting a subset of color themes, such as a "most popular" color themes folder, by the user launching another application, or in any other way. The user need not be involved in the identification of collections of color themes since the color theme application may make the identification of the color theme collection(s) with or without user interaction. The collection of color themes may or may not contain all available color themes.

There may be one or more tags associated with some or all of the color themes of the collection. Tags may be automatically generated, provided by the user or other users, or associated with a color theme in any other suitable manner. For example, if the identified collection is a collection of sunroom color themes, over time users may add or associate tags with the color themes. A user may tag various color themes with keywords, numbers, or other tags, for example, describing each color theme's content and/or source. As a specific example, a user may go through a color theme collection and label all color themes containing shades of yellow with a "summer" tag and a tag for the desired effect of the season—an "energizing" tag.

As shown in FIG. 3, the application 34, after receiving the identified Color Theme A and identifying a collection of color themes, retrieves all the pre-computed PCFs for the collection, as shown in block 230. The retrieval of the pre-computed PCFs for all associated tags in the collection of color themes is computationally efficient.

As shown in block 240 of FIG. 3, the application 34 determines the PCVs for the retrieved PCFs using the identified color theme, Color Theme A, as the input into each PCF, resulting in a PCV for Color Theme A for each tag in the collection. For example, if the collection contains two tags, "cheerful" and "happy," the application 34 retrieves the pre-computed PCFs for "happy" and "cheerful," then uses Color Theme A as input into each PCF. The application uses the "cheerful" PCF to determine a "cheerful" PCV, thus determining how appropriate the "cheerful" tag is for Color Theme A, and so on.

After determining the Color Theme A PCV for each tag of the collection, the application 34 determines a subset of suggested tags for the identified color theme, as shown in block 250. The subset of suggested tags is determined by sorting the PCVs to determine the tags with the highest PCV. The determined subset includes the tags estimated to be the most descriptive for the identified color theme. This results in a list of suggested tags that may be suggested to a user or even automatically associated with the identified color theme—Color Theme A.

The resulting PCVs for Color Theme A will typically be stored in the database to facilitate more efficient future tag searches.

Illustrative Embodiment of Using a Tag to Search for Color Themes

One embodiment of the present disclosure involves using a tag to determine appropriate or suggested color themes for the identified tag and suggesting those color themes to the user based on descriptiveness values.

Figure 6:
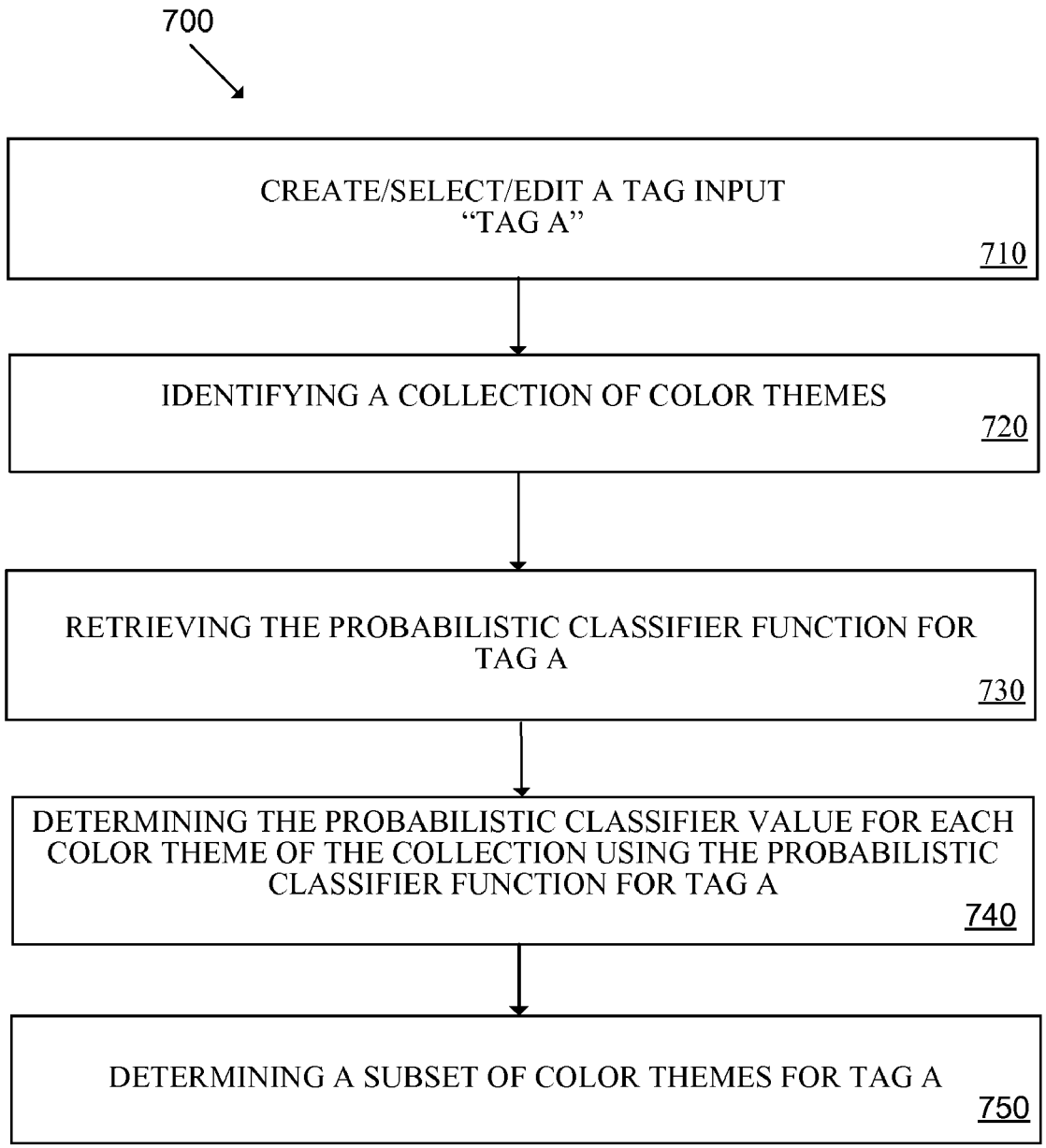
FIG. 6 is a flow chart illustrating one method of suggesting color themes based on an identified tag according to one embodiment.

FIG. 6 is a flow chart illustrating one method of suggesting color themes based on an identified tag according to one embodiment. In the method 700 of discovering color themes shown in FIG. 6, a user 3 invokes an application 34 and inputs a tag—"Tag A," as shown in block 710. The user can input a word, a number, a symbol, or any other appropriate tag. For example, the user may enter "summer," "100," or even "$" to search for appropriate color themes. Regardless of the form of tag, the tag will be used by the application 34 as input to search for appropriate color themes.

An application 34 identifies a collection of color themes 44a-n located on the server 41, as shown in block 720. The collection of color themes may be identified by the user, for example, by the user selecting a subset of color themes, such as a "most popular" color themes folder, by the user launching another application, or in any other way. The user need not be involved in the identification of collections of color themes since the color theme application may make the identification of the color theme collection(s) with or without user interaction. The collection of color themes may or may not contain all available color themes.

The application 34 retrieves the PCF for Tag A from the collection server 41, which has been previously determined, as shown in block 730. The retrieval of the pre-computed PCF for Tag A may result in more efficient tag searching.

After retrieving the PCF for Tag A, the application 34 determines the corresponding PCV for each color theme of the collection, as shown in block 740. The application 34 determines the PCV for each color theme of the collection using each color theme as input to the PCF for Tag A. Thus, the output of the PCF is a PCV which assesses how descriptive Tag A is for each of the color themes of the collection. For example, if the identified tag is "summer," the application 34 determines the "summer" PCV for each color theme of the collection to determine how descriptive the "summer" tag is of each color theme.

In the alternative, instead of the application 34 retrieving the PCF for Tag A and determining the PCV for each color theme of the collection, as shown in blocks 730 and 740, respectively, the application 34 upon receiving the identified tag—Tag A (as shown in block 710) and identifying the collection (as shown in block 720), could retrieve the pre-computed PCVs for Tag A as stored on the server 41.

Multiple tags may be used to search for color themes. In an embodiment of the present disclosure, if a user inputs "Tag A" and "Tag C," the application 34 retrieves the pre-computed PCVs for Tag A and Tag C, and for each color theme determines the Total PCV (a value between 0 and 1) by multiplying the corresponding PCVs. For example, if Color Theme W had a PCV of 0.8 for Tag A and 0.1 for Tag C, the Total PCV for Color Theme W for Tags A and C may be expressed as: $(0.8)*(0.1)=0.08$.

As shown in block 750 of FIG. 6, the application 34 after determining or retrieving the PCVs for Tag A, determines a subset of color themes for the identified tag. The subset of color themes is determined by sorting the PCVs to determine the color themes with the highest PCV. The determined subset represents the color themes of the collection with the most appropriate color characteristic representation for the identified tag. This results in a list of suggested color themes for the identified tag.

Illustrative Embodiment of Displayed Results

Figure 4:
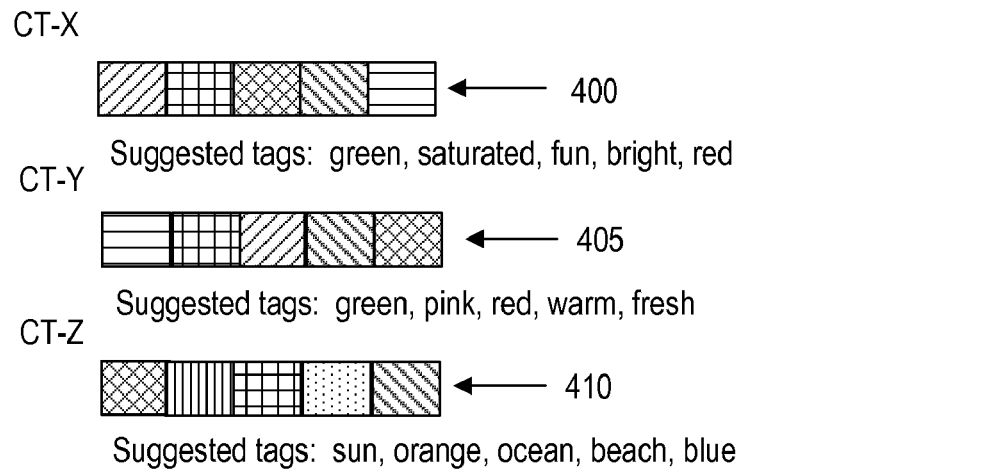
FIG. 4 is an exemplary illustration of several suggested tags sets determined based on identified color themes according to one embodiment.

FIG. 4 illustrates exemplary suggested tags results based on an identified color theme according to one embodiment. In the example, color theme (CT-X) 400 is inputted and a list of suggested tags is generated providing tags appropriately linked with the color characteristics of color theme 400. For instance, the tag "green" is listed first in the list of suggested tags, which corresponds to the 4 different shades of green contained in the five-part color theme. The other color themes, CT-Y and CT-Z, 405 and 410, further exemplify the accuracy of suggested tags according to one embodiment.

Figure 5:
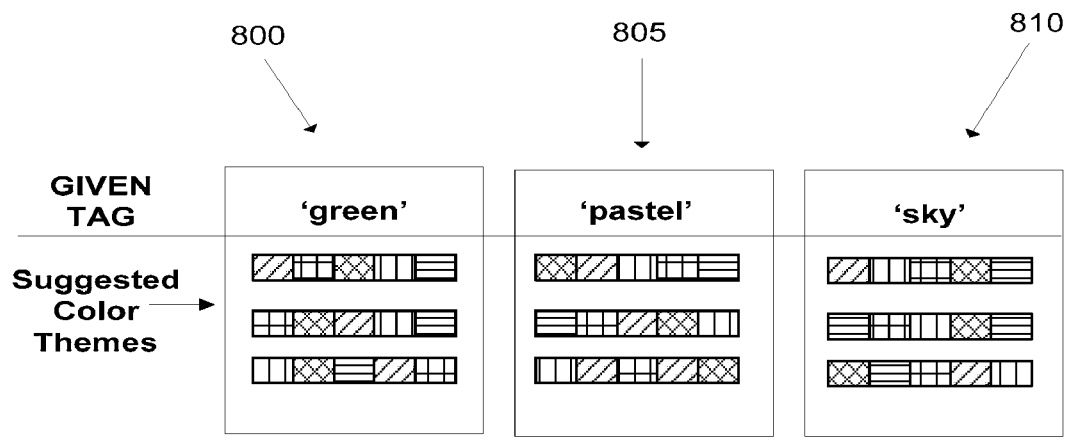
FIG. 5 is an exemplary illustration of several suggested color themes sets determined based on identified tags according to one embodiment.

FIG. 5 illustrates exemplary suggested color theme results based on an identified tag according to one embodiment. In the example, as shown in block 800, the identified tag "green" is inputted and a list of suggested color themes is generated providing the top three color themes in the collection of color themes most appropriately linked with the color characteristics of the identified tag "green." For instance, in the suggested color themes list, as shown in block 800, the top color theme is listed first for the tag "green" because the color theme contains four different shades of green in the five-part color theme. The middle color theme listed for the tag "green" contains three shades of green, as shown in block 800. The other suggested color themes lists, as shown in blocks 805 and 810, further exemplify the suggesting of color themes based on given tags according to one embodiment.

General

The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

That which is claimed:

1. A method, comprising:
    identifying, at a computer, at least one color attribute for a tag based on at least one association of the tag with a first color theme in a collection of color themes, the at least one color attribute being defined as present or absent for the first color theme;
    determining, via the computer, a weight for the at least one color attribute based on the at least one association of the tag with the first color theme, the weight representing a significance of the at least one color attribute to the tag; and
    estimating, via the computer, a descriptiveness value of the tag for a second color theme in the collection of color themes using the at least one color attribute and the weight.

2. The method of claim 1 further comprising determining strong classifier parameters, the strong classifier parameters comprising the at least one color attribute used as a weak classifier and the weight.

3. The method of claim 2, wherein estimating the descriptiveness value comprises determining at least one weak classifier result and a strong classifier result that uses the at least one weak classifier result according to the weight.

4. The method of claim 2, wherein the strong classifier parameters are determined by identifying one or more color themes in the collection of color themes having the tag.

5. The method of claim 1, wherein identifying the at least one color attribute comprises using an Adaboost algorithm.

6. The method of claim 5, wherein determining the weight comprises using the Adaboost algorithm.

7. The method of claim 1, wherein the descriptiveness value of the tag comprises a probabilistic classifier value.

8. The method of claim 1, wherein estimating the descriptiveness value of the tag comprises applying a Platt scaling algorithm to provide a probabilistic classifier value between 0 and 1.

9. The method of claim 1, further comprising estimating a color-theme descriptiveness value for each of the color themes in the collection.

10. The method of claim 9 further comprising:
    receiving the tag as a search term entered in a tag-based color theme search; and
    suggesting one or more color themes based at least in part on the color-theme descriptiveness value of the tag for each of the color themes in the collection.

11. The method of claim 1, wherein identifying the at least one color attribute comprises identifying at least two color attributes based on at least some color themes in the collection associated with the tag and at least some color themes in the collection not associated with the tag.

12. The method of claim 11, wherein determining the weight for the at least one color attribute comprises determining a weight for each of the at least two color attributes based on the at least some color themes in the collection associated with the tag and the at least some color themes in the collection not associated with the tag.

13. The method of claim 12, wherein estimating a descriptiveness value further comprises using the at least two color attributes and the weight for each of the at least two color attributes.

14. The method of claim 1 wherein the weight for each at least one color attribute is determined using a data set comprising the at least one association of the tag with the first color theme and associations of the tag with other color themes in the collection of color themes.

15. The method of claim 1 wherein the weight for each at least one color attribute is determined using a data set comprising:
    positive examples of color themes in the collection of color themes associated with the tag; and
    negative examples of color themes in the collection of color themes not associated with the tag.

16. The method of claim 1 wherein the color theme comprises two or more colors.

17. The method of claim 1 wherein identifying the at least one color attribute comprises using an algorithm that uses a data set comprising:
    positive examples of color themes in the collection of color themes associated with the tag; and
    negative examples of color themes in the collection of color themes not associated with the tag.

18. A method, comprising:
    for a tag associated with a color theme in a collection of color themes:
        identifying at least one color attribute based on at least one association of the tag with a first color theme in the collection of color themes, the at least one color attribute being defined as present or absent for the first color theme; and
        determining a weight for each of the at least one color attributes based on the at least one association of the tag with the color theme, the weight representing a significance of the at least one color attribute to the tag;
    estimating, via a computer, a descriptiveness value of the tag for an identified color theme using the at least one color attribute and the weight; and
    suggesting, via the computer, the tag as an appropriate descriptor for the identified color theme if the descriptiveness value of the tag for the identified color theme is greater than a threshold value.

19. The method of claim 18, wherein identifying the at least one color attribute and determining the weight comprises using an Adaboost algorithm.

20. The method of claim 18, wherein estimating the descriptiveness value of each tag comprises applying a Platt scaling algorithm to provide a probabilistic classifier value between 0 and 1.

21. A method comprising:
    for a search term:
        identifying at least one color attribute based on at least one association of the search term with a first color theme in a collection of color themes, the at least one color attributes being defined as present or absent for the first color theme; and
        determining a weight for the at least one color attribute based on the at least one association of the search term with the first color theme, the weight representing a significance of the tag for the first color theme;

estimating, via a computer, a descriptiveness value of the search term for each color theme in the collection of color themes using the at least one color attribute and the weight; and suggesting, via the computer, at least one color theme from the collection of color themes based at least in part on the descriptiveness value of the search term for each color theme in the collection of color themes.

22. The method of claim 21, wherein identifying the at least one color attribute and determining the weight comprises using an Adaboost algorithm.

23. The method of claim 21, wherein estimating the descriptiveness value of the search term comprises applying a Platt scaling algorithm to provide a probabilistic classifier value between 0 and 1.

24. The method of claim 21, wherein suggesting at least one color theme comprises suggesting up to a predetermined maximum number of color themes.

25. The method of claim 21 wherein the descriptiveness value of the search term for each color theme comprises a quantified value and wherein suggesting at least one color theme comprises selecting color themes for which the quantified value is greater than a threshold value.

26. The method of claim 21 wherein suggesting one or more color themes is based at least in part on a descriptiveness value of a second search term for each color theme.

27. A system, comprising:
a database system comprising a collection of color themes;
a computer system configured to:
identify at least one color attribute for a tag based on at least one association of the tag with a first color theme in a collection of color themes, the at least one color attribute being defined as present or absent for the first color theme;
determine a weight for the at least one color attribute based on the at least one association of the tag with the first color theme, the weight representing a significance of the at least one color attribute to the tag; and
estimate a descriptiveness value of the tag for a second color theme in the collection of color themes using the at least one color attribute and the weight; and
wherein the database system further comprises storing the color attributes, weights, and descriptiveness values.

28. A non-transitory computer-readable medium on which is encoded program code, the program code comprising:
program code for identifying at least one color attribute for a tag based on at least one association of the tag with a first color theme in a collection of color themes, the at least one color attribute being defined as present or absent for the first color theme, and determining a weight for the at least one color attribute based on the at least one association of the tag with the first color theme, the weight representing a significance of the at least one color attribute to the tag; and
program code for estimating a descriptiveness value of the tag for a second color theme in the collection of color themes using the at least one color attribute and the weight.

* * * * *